US009485666B2

(12) United States Patent
Kang et al.

(10) Patent No.: US 9,485,666 B2
(45) Date of Patent: Nov. 1, 2016

(54) AVAILABLE CHANNEL INFORMATION SHARING SYSTEM AND AVAILABLE CHANNEL INFORMATION SHARING METHOD

(71) Applicant: ELECTRONICS AND TELECOMMUNICATIONS RESEARCH INSTITUTE, Daejeon (KR)

(72) Inventors: Kyu Min Kang, Daejeon (KR); Jae Cheol Park, Daejeon (KR); Byung Jang Jeong, Daejeon (KR); Sang In Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/694,196

(22) Filed: Apr. 23, 2015

(65) Prior Publication Data

US 2015/0312770 A1 Oct. 29, 2015

(30) Foreign Application Priority Data

Apr. 24, 2014 (KR) ........................ 10-2014-0049501

(51) Int. Cl.
*H04W 72/04* (2009.01)
*H04W 16/14* (2009.01)
*H04W 64/00* (2009.01)

(52) U.S. Cl.
CPC ............. *H04W 16/14* (2013.01); *H04W 64/00* (2013.01)

(58) Field of Classification Search
CPC ............................. H04W 16/14; H04W 64/00
USPC ......... 455/509, 454, 562.1, 552.1, 522, 457, 455/456.1, 501, 440, 517, 450, 436, 434, 455/63.3, 67.11; 370/329, 252, 338, 237, 370/315, 336, 328; 725/73, 62, 133
See application file for complete search history.

(56) References Cited

U.S. PATENT DOCUMENTS

| 8,923,770 | B2 * | 12/2014 | Hassan | H04L 1/0033 |
| | | | | 348/729 |
| 8,954,087 | B2 * | 2/2015 | Lee | H04W 16/14 |
| | | | | 455/452.1 |
| 9,332,484 | B2 * | 5/2016 | Kim | H04W 48/16 |
| 2006/0003777 | A1 * | 1/2006 | Nonoyama | G01S 5/0072 |
| | | | | 455/457 |
| 2011/0090887 | A1 * | 4/2011 | Kim | H04W 16/14 |
| | | | | 370/338 |
| 2011/0116458 | A1 * | 5/2011 | Hsu | H04W 16/14 |
| | | | | 370/329 |
| 2011/0182257 | A1 * | 7/2011 | Raveendran | H04H 20/61 |
| | | | | 370/329 |
| 2011/0222488 | A1 * | 9/2011 | Kim | H04W 72/0426 |
| | | | | 370/329 |
| 2012/0063383 | A1 * | 3/2012 | Barbieri | H04W 72/082 |
| | | | | 370/315 |

(Continued)

*Primary Examiner* — Tan H Trinh
(74) *Attorney, Agent, or Firm* — Ladas & Parry LLP

(57) ABSTRACT

Disclosed are an available channel information sharing system and an available channel information sharing method, and an available channel information sharing system and an available channel information sharing method based on positional information and area information. The available channel information sharing system sharing available channel information for each unit region includes: a server; a white band device placed in the unit region; and a white band sensing device creating positional information and transmitting the created positional information to the server, receiving unit region information corresponding to the positional information from the server, and transmitting first available channel information based on channel information of a sensed broadcasting signal to the white band device.

19 Claims, 10 Drawing Sheets

(56) References Cited

U.S. PATENT DOCUMENTS

| | | | | |
|---|---|---|---|---|
| 2012/0163179 A1* | 6/2012 | Jo | H04B 7/15507 | 370/237 |
| 2012/0269246 A1* | 10/2012 | Thakur | H04W 16/14 | 375/224 |
| 2012/0315855 A1* | 12/2012 | Li | H04W 16/14 | 455/67.7 |
| 2013/0003591 A1* | 1/2013 | Novak | H04W 36/06 | 370/252 |
| 2013/0051279 A1* | 2/2013 | Lee | H04W 16/14 | 370/254 |
| 2013/0057436 A1* | 3/2013 | Krasner | G01S 19/11 | 342/464 |
| 2013/0122951 A1* | 5/2013 | Kim | H04W 48/16 | 455/509 |
| 2013/0143613 A1* | 6/2013 | Lee | H04W 48/08 | 455/509 |
| 2013/0184025 A1* | 7/2013 | Cho | H04W 72/0453 | 455/509 |
| 2013/0231108 A1* | 9/2013 | Kim | H04W 48/16 | 455/434 |
| 2013/0252657 A1* | 9/2013 | Kafle | H04W 52/367 | 455/522 |
| 2014/0003361 A1* | 1/2014 | Song | H04W 16/14 | 370/329 |
| 2014/0018114 A1* | 1/2014 | Jo | H04W 16/14 | 455/501 |
| 2014/0038657 A1* | 2/2014 | Jo | H04W 72/005 | 455/509 |
| 2014/0066086 A1* | 3/2014 | Jo | H04L 27/0006 | 455/454 |
| 2014/0301237 A1* | 10/2014 | Yi | H04W 24/10 | 370/252 |
| 2014/0357279 A1* | 12/2014 | Lee | H04W 36/32 | 455/440 |
| 2015/0029983 A1* | 1/2015 | Kimoto | H04W 16/14 | 370/329 |
| 2015/0063332 A1* | 3/2015 | Lee | H04W 74/002 | 370/338 |
| 2015/0133177 A1* | 5/2015 | Garnett | H04W 64/00 | 455/501 |
| 2015/0327265 A1* | 11/2015 | Lee | H04W 72/0446 | 370/311 |
| 2016/0001671 A1* | 1/2016 | Mori | B60L 11/1827 | 701/22 |

* cited by examiner

AVAILABLE CHANNEL INFORMATION SHARING SYSTEM AND AVAILABLE CHANNEL INFORMATION SHARING METHOD

CROSS-REFERENCE TO RELATED APPLICATIONS

This application claims priority to and the benefit of Korean Patent Application No. 10-2014-0049501 filed in the Korean Intellectual Property Office on Apr. 24, 2014, the entire contents of which are incorporated herein by reference.

TECHNICAL FIELD

The present invention relates to an available channel information sharing system and an available channel information sharing method, and more particularly, to an available channel information sharing system and an available channel information sharing method based on positional information.

BACKGROUND ART

A TV white space (TVWS) in a TV broadcasting (in particular, digital TV broadcasting) system means a band which is not used in a TV broadcasting band. That is, a frequency band other than a band which a primary user or an incumbent user such as a broadcast provider services by using a licensed frequency is referred to as a white space.

Since the white band, in particular, the TV white space has an excellent propagation characteristic to wider service coverage than a high frequency of 1 GHz or higher, the TV white space may be used to provide various-purpose services including public safety, a regional information providing service, Super WiFi, and the like. In this regard, developed countries including USA, UK, and the like are primarily establishing a technological standard for using the TV white space in order to efficiently use insufficient frequency resources and provide various high-quality services.

In the digital TV broadcasting system, a white band device (alternatively, TV band device (TVBD)) finds and uses an available channel. A method by which the white band device finds the available channel includes a method using a beacon, a method of sensing a spectrum, and a method using a database.

Among them, the spectrum sensing method is a scheme in which a primary user signal is sensed in a region to use the white band device and thereafter, the available channel is directly found based on the sensing result. The spectrum sensing method requires accurately sensing the primary user signal in order to determine whether the white band device can use a channel of the white space while safely protecting the primary user signal.

SUMMARY OF THE INVENTION

A reference of a sensing threshold value for determining whether to sense a white band device (a TVBD in the case of a TV band) that performs a spectrum sensing method should be previously set in order to accurately sense a primary user signal. To this end, authorities of the developed countries suggested a sensing threshold value by considering an influence by hidden node attenuation as high as −35 dB. However, since the sensing threshold value is lower than a thermal noise level, it is not easy to implement hardware that performs spectrum sensing.

Therefore, the present invention is contrived by considering the problem and a white band device that performs a spectrum sensing method is placed in a region less influenced by the hidden node attenuation to sense the primary user signal by a value larger than the predetermined threshold value and allow available channel information to be shared with other white band devices based on the sensed primary user signal.

An exemplary embodiment of the present invention provides an available channel information sharing system sharing available channel information for each unit region, including: a server; a white band device placed in the unit region; and a white band sensing device creating positional information and transmitting the created positional information to the server, receiving unit region information corresponding to the positional information from the server, and transmitting first available channel information based on channel information of a sensed broadcasting signal to the white band device.

The white band device may provide a white band service by using the first available channel information.

The white band device may create second available channel information based on channel information of the sensed broadcasting signal and transmit the second available channel information to the white band sensing device.

The white band sensing device may transmit to the white band device third available channel information in which the first available channel information and the second available channel information are combined with each other.

The system may further include an access point device relaying and transmitting the first available channel information from the white band sensing device to the white band device.

The white band sensing device may be placed in an area where is perceptible the broadcasting signal as a value equal to or more than a predetermined sensing threshold value.

Another exemplary embodiment of the present invention provides an available channel information sharing system sharing available channel information for each unit region, including: a server; a first white band device placed in the unit region; and a second white band device creating positional information and transmitting the created positional information to the server, receiving unit region information and area information corresponding to the positional information from the server, and transmitting available channel information based on channel information of a sensed broadcasting signal to the first white band device when the area information represents an area where is perceptible the broadcasting signal.

When the area information represents an area where is imperceptible the broadcasting signal, the second white band device may receive the available channel information from another second white band device in the unit region, which has received area information representing an area where is perceptible the broadcasting signal.

At least one of the first white band device, the second white band device, and another second white band device may provide a white band service by using the available channel information.

The area where is perceptible the broadcasting signal may be an area where is perceptible the broadcasting signal as a value equal to or more than a predetermined sensing threshold value.

The area where is imperceptible the broadcasting signal may be an area where is perceptible sense the broadcasting signal as a value less than the predetermined sensing threshold value.

The system may further include an access point device relaying and transmitting the available channel information to the first white band device from the second white band device.

The unit region may have any one shape of a square shape, a circular shape, and a hexagonal shape.

According to exemplary embodiments of the present invention, in an available channel information sharing system and an available channel information sharing method, when a white band sensing device is placed in an open region less influenced by hidden node attenuation, although a (channel of) DTV signal is sensed by using as a sensing threshold value a value which is larger than −114 dBm/6 MHz presented by the Federal Communications Commission (FCC) or −120 dBm/8 MHz presented by the Office of Communications (Ofcom) by at least approximately 20 dB or larger, the (channel of) DTV signal in a unit region can be sensed with high reliability and accuracy. With this, hardware implementation of a signal sensing module and a white band sensing device is also facilitated.

All white band devices can stably share available channel information through a communication network regardless of the level of the influence by the hidden node attenuation and whether the signal sensing module is installed in one unit region.

According to another exemplary embodiment of the present invention, the white band sensing device can combine one or more pieces of available channel information. As a result, available channel information with higher reliability can be created. The available channel information with high reliability can be shared in the unit region.

According to another exemplary embodiment of the present invention, even when the white band sensing device itself cannot assure a region where the white band sensing device is placed, the white band sensing device can perform a more appropriate available channel information acquiring method depending on regional information received from a server.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Objects of the present invention are not limited the aforementioned object and other objects and advantages of the present invention, which are not mentioned can be appreciated by the following description and will be more apparently know by the exemplary embodiments of the present invention. It can be easily known that the objects and advantages of the present invention can be implemented by the means and a combination thereof described in the appended claims.

Figure 1:
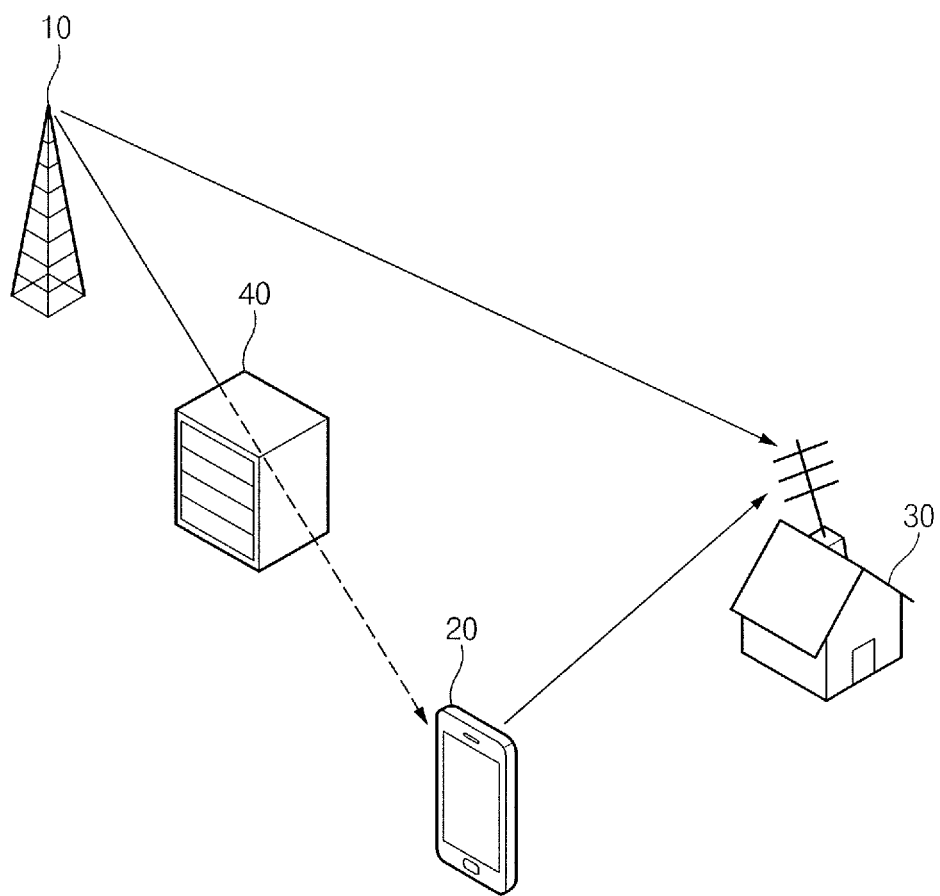
FIG. 1 is a diagram for describing a concept of hidden node attenuation.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In this application, white band may be referred to as a frequency band which is not used by primary user within the entire frequency band, and a primary user signal may be referred to as a signal which is used by licensed device.

Although, in this application, the primary user signal may be described as a digital television (DTV) signal, the primary user signal is not limited to the DTV signal. Also, white band service may include broadcasting services or telecommunication services provided through the frequency band which is not used by the primary user signal, and may be referred to as secondary user service.

[Hidden Node Attenuation, Sensing Threshold Value]

FIG. 1 is a diagram for describing a concept of hidden node attenuation. Referring to FIG. 1, the hidden node attenuation and a sensing threshold value will be described.

For example, when a DTV signal is transmitted from a broadcasting station 10 that provides a DTV broadcasting service by using channel No. a, a DTV receiver 30 in a DTV broadcasting area may receive the DTV signal and receive a service of a DTV broadcast. A TV white band device 20 using a spectrum sensing method determines an available channel based on a sensed DTV signal and thereafter, provides a TV white space service.

However, as illustrated in FIG. 1, an obstacle 40 such as a high mountain or a high building may be positioned on a transmission path of the DTV signal. In general, since an antenna of the DTV receiver 30 is installed at a height of approximately 10 m from the ground, an influence by the obstacle is relative small. However, since an antenna of a personal/portable white band device 20 is positioned at a height of approximately 1.5 m, the obstacle 40 may attenuate the DTV signal. The attenuation by the obstacle 40 is referred to as hidden node attenuation.

However, when the hidden node attenuation occurs, the TV white band device 20 determines the channel a of the DTV signal from the broadcasting station as a unused channel and provides the TV white space service by using the corresponding channel a. Therefore, the DTV receiver 30 undergoes an interference influence in the corresponding channel a. And stable reception of the DTV signal which is the primary user signal may not be secured.

Accordingly, in order to reduce the interference influence, the DTV signal should be accurately sensed, and as a result, a reference of the sensing threshold value used to determine whether to sense the DTV signal should be set. The reference of the sensing threshold value is determined by considering receiving sensitivity of the DTV receiver 30, an antenna gain of the DTV receiver 30, feeder loss, a hidden node margin by the hidden node attenuation, and the like. Therefore, the US Federal Communications Commission (FCC) presents −114 dBm/6 MHz as the reference of the sensing threshold value of the DTV signal. The UK Office of Communications (Ofcom) presents −120 dBm/8 MHz by considering the influence by the hidden node attenuation of −35 dB at the time of determining the DTV sensing threshold value reference.

However, since sensing threshold value references presented as above are lower than −174 dBm/Hz=−106.2 dBm/6 MHz) which is a thermal noise level, it is not easy to implement hardware that performs spectrum sensing with high accuracy and reliability.

The present invention relates to an available channel information sharing system and an available channel information sharing method that place the white band device performing the spectrum sensing in a region less influenced by the hidden node attenuation to sense the DTV signal even by a threshold value higher than the presented sensing threshold values with high reliability and share available channel information based on the sensed DTV signal with other white band devices. This will be described below as exemplary embodiments.

First Exemplary Embodiment

Figure 2:
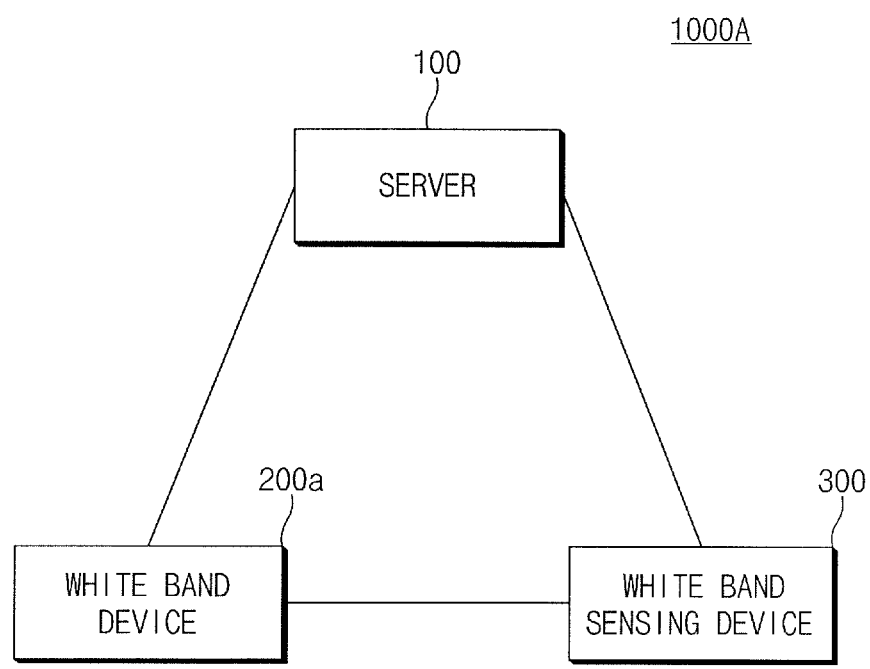
FIG. 2 is a diagram illustrating an available channel information sharing system according to a first exemplary embodiment of the present invention.
Figure 3:
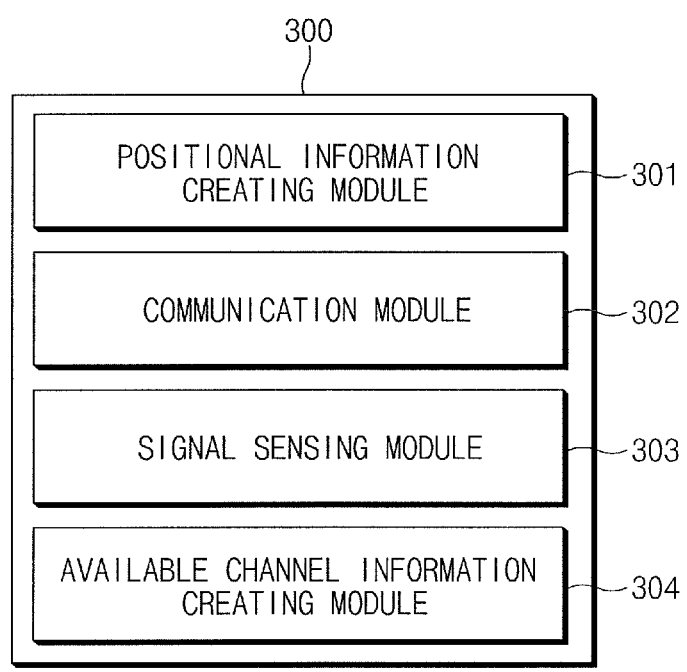
FIG. 3 is a diagram illustrating an example of a white band sensing device according to the first exemplary embodiment of the present invention.

Available Channel Information Sharing System According to First Exemplary Embodiment FIG. 2 is a diagram illustrating an available channel information sharing system 1000A according to a first exemplary embodiment of the present invention. FIG. 3 is a diagram illustrating an example of a white band sensing device 300 according to the first exemplary embodiment of the present invention.

Referring to FIG. 2, the available channel information sharing system 1000A sharing available channel information for each unit region according to the first exemplary embodiment of the present invention includes a server 100, a white band device 200a placed in the unit region, and a white band sensing device 300 creating positional information and transmitting the created positional information to the server 100, receiving unit region information corresponding to the positional information from the server 100, and transmitting first available channel information created based on channel information of a sensed broadcasting signal to the white band device 200a.

The server 100 receives the positional information from the white band sensing device 300 and transmits the unit region information to the white band sensing device 300 as a response thereto. A database (not illustrated) storing the unit region information representing unit regions corresponding to respective positions is built up in the server 100. The server 100 extracts the unit region information on the unit region corresponding to the position represented by the received positional information. In this case, the unit region is a region representing a minimum region range on which the white band device and the white band sensing device share the available channel information. A channel of a DTV signal (primary user signal) or the shared available channel information may vary depending on the unit region stored in the database of the server 100.

The white band device 200a includes a communication module (not illustrated) that receives the available channel information from the white band sensing device 300 through a communication network. The white band device may also be called a TV white band device or a TV band device when using a TV white space (TVWS). In some exemplary embodiments, the white band device 200a may include a white band service module (not illustrated) capable of providing a white band service by using the available channel information.

Referring to FIG. 3, the white band sensing device 300 includes a positional information creating module 301, a communication module 302, a signal sensing module 303, and an available channel information creating module 304. The white band sensing device 300 may be a dedicated white band sensing device. The white band sensing device 300 may be implemented by a personal/portable TVBD including a signal sensing module or a fixed TVBD including the signal sensing module when using the TVWS.

The positional information creating module 301 creates positional information of a position at which the white band sensing device 300 is placed. The positional information may be created by using a method using a GPS satellite or a triangulation method through the communication network. The positional information may be configured to include, for example, a latitude and a longitude.

The communication module 302 is a module that serves to transmit and receive information in the white band sensing device 300. The communication module 302 may communicate with the server 100 and the white band device 200a by accessing a general wired/wireless communication means (for example, an Internet network). In the exemplary embodiment, all information which the white band sensing device 300 transmits between the server 100 and the white band device 200a is transmitted through the communication module 302.

The signal sensing module 303 may sense the DTV signal transmitted from the broadcasting station and identify a channel of the DTV signal. In this case, whether the signal sensing module 303 senses the DTV signal may be determined based on a predetermined threshold value. In particular, when the white band sensing device 300 is placed in a region less influenced by hidden node attenuation, the predetermined threshold value is determined as a value higher than −114 dBm/6 MHz presented by the US FCC or −120 dBm/8 MHz presented by the UK Ofcom by at least 20 dB or higher to implement the signal sensing module 303.

The available channel information creating module 304 creates the available channel information based on the channel of the DTV signal sensed and identified by the signal sensing module 303. The available channel information is information used to determine a channel for providing the white band service. The white band service may be provided by using a channel which is not used by the DTV signal based on the available channel information.

A configuration of the available channel information sharing system 1000A according to the first exemplary embodiment of the present invention is described as above and hereinafter, an available channel information sharing method according to the first exemplary embodiment will be described.

Figure 4:
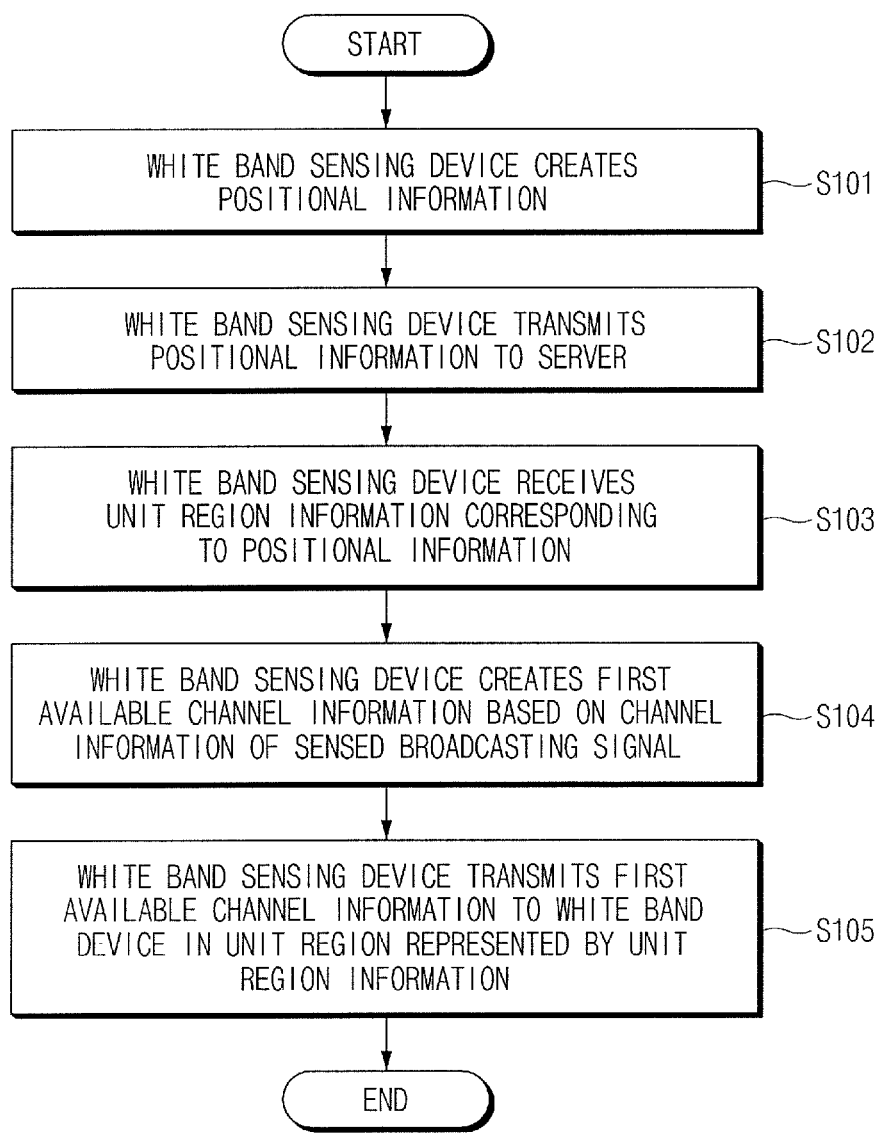
FIG. 4 is a diagram illustrating an available channel information sharing method according to the first exemplary embodiment of the present invention.

Available Channel Information Sharing Method According to First Exemplary Embodiment FIG. 4 is a diagram illustrating an available channel information sharing method according to the first exemplary embodiment of the present invention.

Referring to FIG. 4, the available channel information sharing method according to the first exemplary embodiment of the present invention includes creating, by a white band sensing device 300, positional information (S101), transmitting, by the white band sensing device 300, the positional information to a server 100 (S102), receiving, by the white band sensing device 300, unit region information corresponding to the positional information from the server 100 (S103), creating, by the white band sensing device 300, first available channel information based on channel information of a sensed broadcasting signal (S104), and transmitting, by the white band sensing device 300, the first available channel information to a white band device 200a of the unit region represented by the unit region information (S105).

First, in step S101, a positional information creating module 301 of the white band sensing device 300 creates positional information of a position at which the white band sensing device 300 is placed. As described above, the positional information may be created by using a method using a GPS satellite. The positional information may be configured to include, for example, a latitude and a longitude.

Subsequently, in step S102, a communication module 302 of the white band sensing device 300 transmits the positional information created in step S101 to the server 100.

In step S103, the communication module 302 of the white band sensing device 300 receives unit region information on the position of the white band sensing device 300 as a response to the positional information from the server 100.

In step S104, the signal sensing module 303 senses a DTV signal transmitted from a broadcasting station and an available channel information creating module 304 creates first available channel information based on the sensed DTV signal.

In this case, whether to sense the DTV signal may be determined based on a predetermined threshold value as described above. In particular, the predetermined threshold value may be a value higher than −114 dBm/6 MHz presented by the US FCC or −120 dBm/8 MHz presented by the UK Ofcom by at least 20 dB or higher.

In step S105, the communication module 302 of the white band sensing device 300 transmits the first available channel information to a white band device 200a which is positioned in the same unit region as the white band sensing device 300 through a communication network (for example, an Internet network).

Meanwhile, in some exemplary embodiments, the method may further include providing a white band service by using the first available channel information which the white band device 200a receives from the white band sensing device 300.

According to the available channel information sharing system 1000A and the available channel information sharing method according to the first exemplary embodiment of the present invention, when the white band sensing device 300 is placed in an open region, a sensing threshold value may be set as a value higher than −114 dBm/6 MHz presented by the US FCC or −120 dBm/8 MHz presented by the UK Ofcom by at least 20 dB or higher. Although the sensing threshold value is set to a high value, the (channel of) the DTV signal in the unit region may be sensed with high reliability and accuracy. Therefore, it is easy to implement hardware of the signal sensing module 303 and the white band sensing device 300.

Although the white band device 200a is placed around a high building or in a mountainous region which is a region in which the hidden node attenuation is severe, the white band device 200a may stably receive the available channel information from the white band sensing device 300 in the unit region. Even when the white band device 200a does not include the signal sensing module not to sense the DTV signal, the white band device 200a may receive the available channel information from the white band sensing device 300 in the same unit region.

Consequently, all white band devices 200a can stably share available channel information from the white band sensing device 300 through a communication network regardless of the level of the influence by the hidden node attenuation and whether the signal sensing module is installed in one unit region.

When the white band device 200a includes a white band service module, since the white band device 200a may receive the common available channel information with high reliability from the white band sensing device 300, a stable white band service may be provided while safely protecting the DTV signal from an interference influence.

Modified Example of First Exemplary Embodiment

Figure 5:
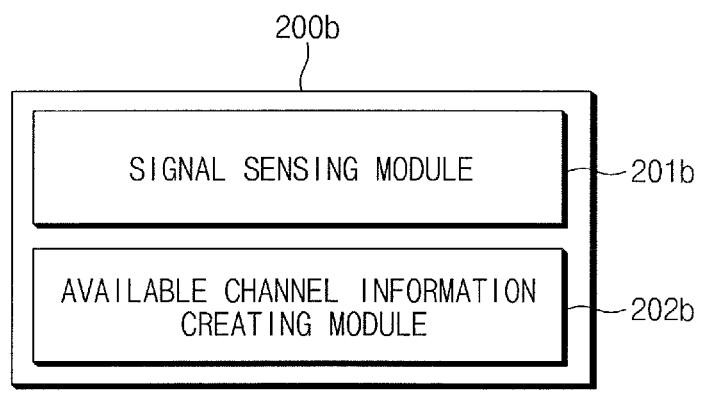
FIG. 5 is a diagram for describing a white band device of an available channel information sharing system according to a modified example of the first exemplary embodiment of the present invention.

Available Channel Information Sharing System According to Modified Example of First Exemplary Embodiment Hereinafter, the available channel information sharing system 1000B according to the modified example of the first exemplary embodiment will be described. FIG. 5 is a diagram for describing a white band device 200b of an available channel information sharing system 1000B according to the modified example of the first exemplary embodiment of the present invention.

A configuration of the available channel information sharing system 1000B according to the modified example of the first exemplary embodiment of the present invention is different only in a configuration of the white band device 200b and is the same as that of the available channel information sharing system 1000A according to the first exemplary embodiment.

According to FIG. 5, the white band device 200b includes a signal sensing module 201b and an available channel information creating module 202b in addition to the configuration of the white band device 200a.

The signal sensing module 201b may sense the DTV signal transmitted from the broadcasting station and identify the channel of the DTV signal similarly as the signal sensing module 303 of the white band sensing device 300. Whether to sense the DTV signal may be determined based on a predetermined threshold value similarly as the signal sensing module 303 of the white band sensing device 300.

The available channel information creating module 202b creates second available channel information based on the channel of the DTV signal sensed and identified by the signal sensing module 201b.

A communication module (not illustrated) of the white band device 200b may transmit the second available channel information created by the available channel information creating module 202b to the white band sensing device 300.

Meanwhile, the available channel information creating module 304 of the white band sensing device 300 may combine the first available channel information created by the available channel information creating module 304 and the second available channel information received from the white band device 200b. The available channel information creating module 304 may create third available channel information in which the DTV signal is sensed with high sensitivity and the channel of the DTV signal is identified with high sensitivity based on the combination. The third available channel information may be transmitted to the white band device 200b by the communication module 302 of the white band sensing device 300.

Figure 6:
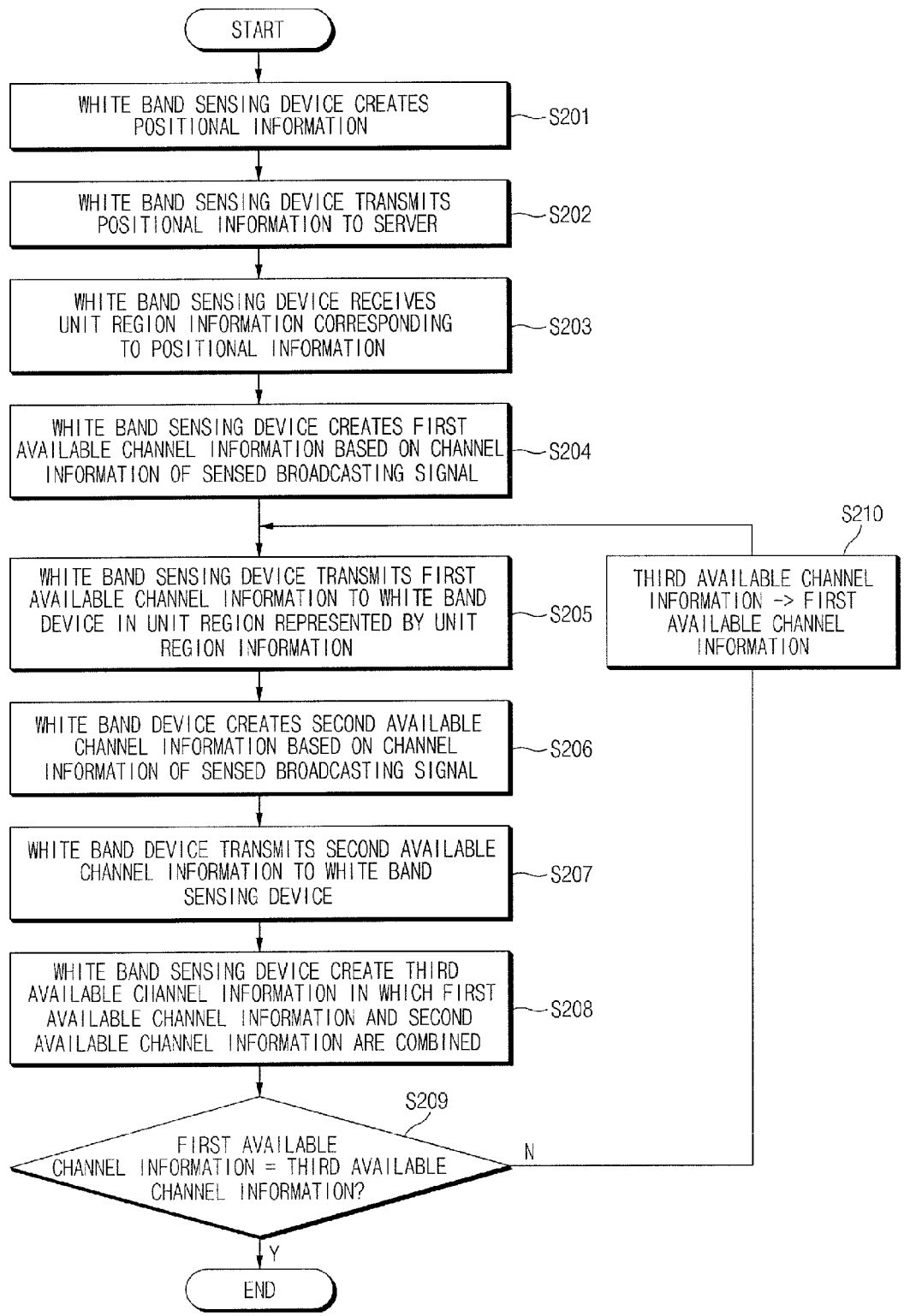
FIG. 6 is a diagram illustrating an available channel information sharing method according to a modified example of the first exemplary embodiment of the present invention.

Available Channel Information Sharing Method According to Modified Example of First Exemplary Embodiment FIG. 6 is a diagram illustrating an available channel information sharing method according to a modified example of the first exemplary embodiment of the present invention. Referring to FIG. 6, the available channel information sharing method according to the modified example of the first exemplary embodiment will be described. Steps S201 to S205 of FIG. 6 are the same as steps S101 to S105 of FIG. 4.

In step S206, a signal sensing module 201b senses a DTV signal transmitted from a broadcasting station and an available channel information creating module 202b creates second available channel information based on the sensed DTV signal.

In step S207, a communication module (not illustrated) of the white band device 200b transmits the second available channel information to the white band sensing device 300.

In step S208, the white band sensing device 300 combines the first available channel information created by the white band sensing device 300 and the second available channel information received from the white band device 200b to create third available channel information in which the DTV signal is sensed with high sensitivity and the channel of the DTV signal is identified with high sensitivity.

In step S209, the combined third available channel information and the first available channel information created by the white band sensing device 300 are compared with each other. When the third available channel information and the first available channel information are the same as each other, this method is ended (Y in S209) and when the third available channel information and the first available channel information are not the same as each other, the process proceeds to step S210.

In step S210, the white band sensing device 300 considers the third available channel information as the first available channel information and repeats steps S205 to S208. Through such a process, the white band sensing device 300 and the white band device 200b share the same (third) available channel information in which the first available channel information and the second available channel information are combined with each other.

According to the available channel information sharing system 1000B and the available channel information sharing method according to the modified example of the first exemplary embodiment of the present invention, the white band sensing device 300 may create the third available channel information based on the first available channel information created by the white band sensing device 300 and the second available channel information from the white band device 200b.

Therefore, since the first available channel information and the second available channel information are combined with each other even when the white band sensing device 300 is placed in a hidden region and the white band device 200b is placed in an open region, the white band sensing device 300 may create the third available channel information based on the channel of the DTV signal which is sensed with high sensitivity. Since the third available channel information may be transmitted to the white band device 200b, available channel information with higher precision and reliability may be shared in the unit region in addition to the advantage of the first exemplary embodiment of the present invention.

Second Exemplary Embodiment

Figure 7:
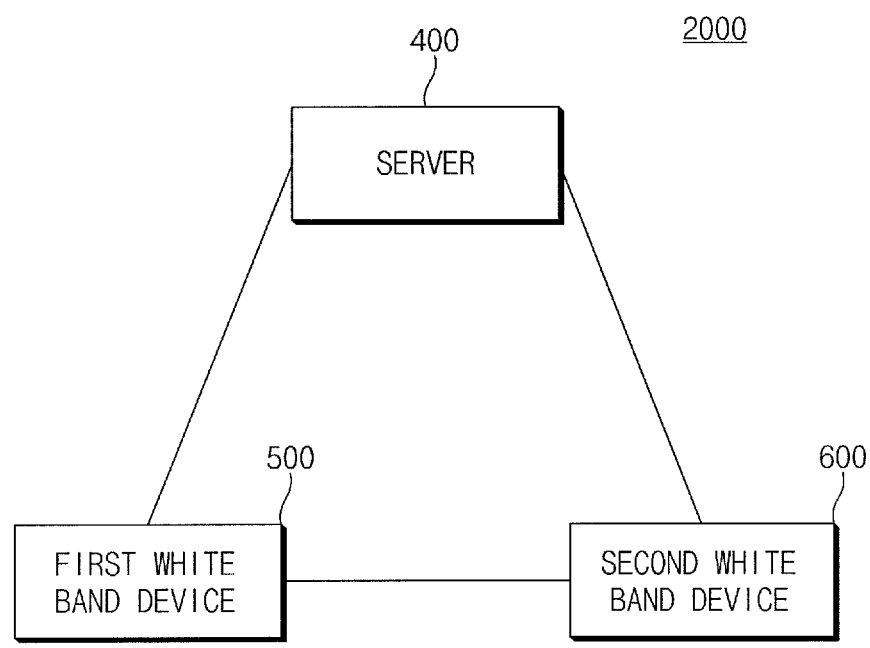
FIG. 7 is a diagram illustrating an available channel information sharing system according to a second exemplary embodiment of the present invention.
Figure 8:
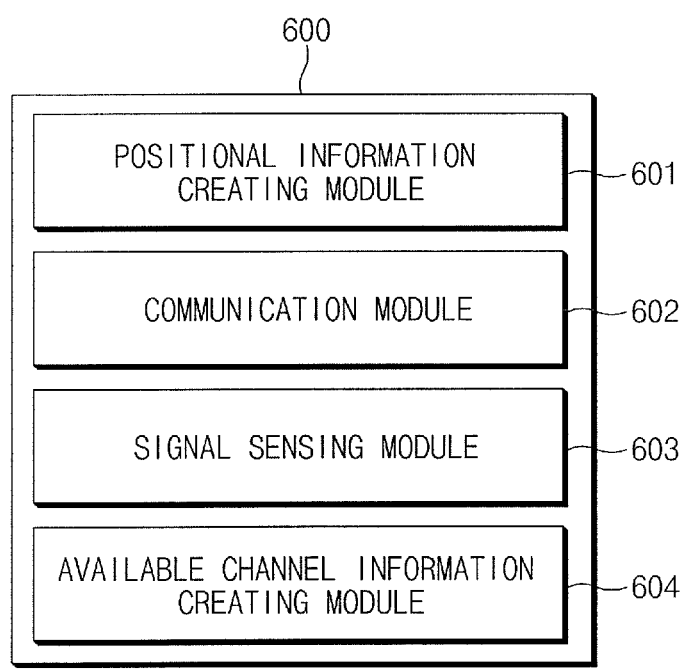
FIG. 8 is a diagram illustrating an example of a second white band device according to the second exemplary embodiment of the present invention.

Available Channel Information Sharing System According to Second Exemplary Embodiment FIG. 7 is a diagram illustrating an available channel information sharing system 2000 according to a second exemplary embodiment of the present invention. FIG. 8 is a diagram illustrating an example of the second white band device 600 according to the second exemplary embodiment of the present invention.

Referring to FIG. 7, the available channel information sharing system 2000 sharing available channel information for each unit region according to the second exemplary embodiment of the present invention includes a server 400, a first white band device 500 placed in the unit region, and a second white band device 600 creating positional information and transmitting the created positional information to the server 400, receiving unit region information and area information corresponding to the positional information from the server 400, and transmitting available channel information created based on channel information of a sensed broadcasting signal to the first white band device 500 when the area information represents a region to sense the broadcasting signal.

The server 400 receives the positional information from the second white band device 600 and transmits the unit region information and the area information to the second white band device 600 as a response thereto. A database (not illustrated) storing the unit region information and the area information corresponding to respective positional information is built up in the server 400. The server 400 extracts the unit region information and the area information corresponding to the received positional information. The extracted unit region information and area information are transmitted to the second white band device 600.

In this case, the unit region information is information representing a region in which the channel of the DTV signal is common as described above.

The area information is information representing whether a position represented by the received positional information is in a first area which is an area where is perceptible the DTV signal or a second area which is an area where is imperceptible the DTV signal. In this case, whether to sense the DTV signal may be determined based on a predetermined threshold value by considering the hidden node attenuation. For example, the predetermined threshold value may be a predetermined value higher than −114 dBm/6 MHz presented by the US FCC or −120 dBm/8 MHz presented by the UK Ofcom by at least 20 dB or higher. That is, the DTV signal is divided by setting an area (an area in which the hidden node attenuation is small) sensed as a value equal to or more than the predetermined threshold value as the first area and an area (an area in which the hidden node attenuation is severe) sensed as a value less than the predetermined threshold value as the second area.

Meanwhile, in another exemplary embodiment, the DTV signal may be divided into three or more areas according to the strength of the sensed signal. For example, the area information may be made into a database by dividing the area into a fourth area which is less than the predetermined value higher than −114 dBm/6 MHz by 20 dB, a third area which is higher than the predetermined value by 10 dB, a second area which is higher than the predetermined value by 20 dB, and a fourth area which is higher than the predetermined value by 30 dB.

The first white band device 500 may also be called the TV white band device or the TVBD when using the TVWS. The first white band device 500 may have the same configuration as the second white band device 600 to be described below in some exemplary embodiments.

Referring to FIG. 8, the second white band device 600 includes a positional information creating module 601, a communication module 602, a signal sensing module 603, and an available channel information creating module 604. The second white band device may be implemented as a personal/portable TVBD including a signal sensing module or a fixed TVBD including the signal sensing module when using the TVWS.

The positional information creating module 601 creates positional information of a position to which the white band device 600 belongs. As described above, the positional information may be created by using a method using a GPS satellite or a triangulation method through the communication network. The positional information may be configured in a form of, for example, a latitude and a longitude.

The communication module 602 is a module that serves to transmit and receive information in the white band sensing device 600. The communication module 602 may access a general wired/wireless communication means (for example, an Internet network). The server 400 and the first white band device 500 may communicate with each other by the communication module 602.

The signal sensing module 603 may sense the DTV signal transmitted from the broadcasting station and identify a channel of the DTV signal. However, when the area information represents the second area where the DTV signal is sensed as the value less than the threshold value, the signal sensing module 603 may not sense the DTV signal.

The available channel information creating module 604 creates the available channel information based on the DTV signal sensed and identified by the signal sensing module 603. The white band service may be provided through a channel not used by the DTV signal based on the available channel information.

Since the first white band device 500 and the second white band device 600 may have the same configuration, the second white band device 600 may receive the available channel information from the first white band device 500 in this case. Accordingly, the available channel information creating module 604 of the second white band device 600 may combine the available channel information created by the available channel information creating module 604 and the available channel information received from the first white band device 500. The available channel information with higher reliability may be created by the combination.

A configuration of the available channel information sharing system 2000 according to the second exemplary embodiment of the present invention is described as above and hereinafter, an available channel information sharing method according to the second exemplary embodiment will be described.

Figure 9:
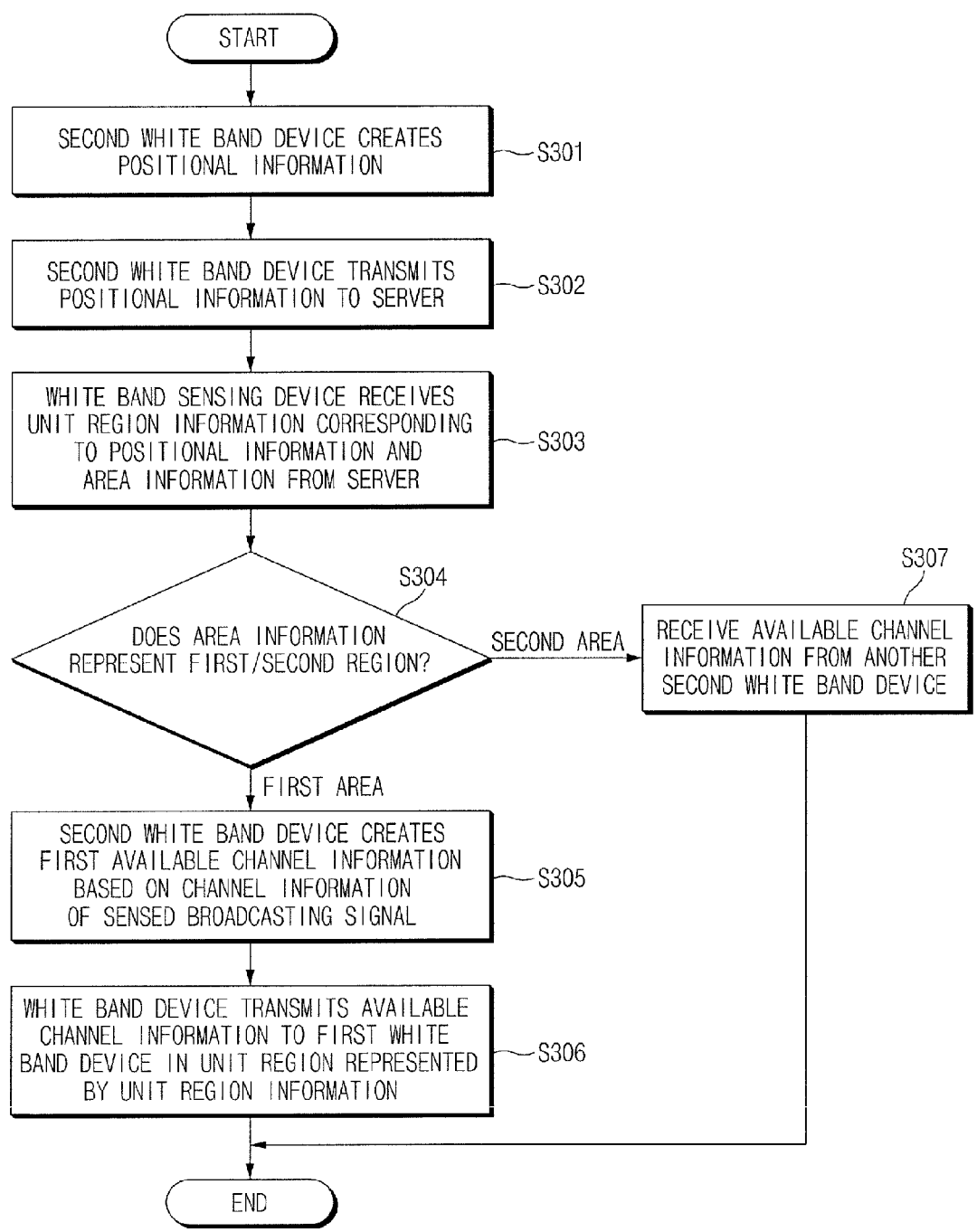
FIG. 9 is a diagram illustrating an available channel information sharing method according to the second exemplary embodiment of the present invention.

Available Channel Information Sharing Method According to Second Exemplary Embodiment FIG. 9 is a diagram illustrating an available channel information sharing method according to the second exemplary embodiment of the present invention.

Referring to FIG. 9, the available channel information sharing method according to the second exemplary embodiment of the present invention includes creating, by a second white band device 600, positional information (S301), transmitting, by a second white band sensing device 600, the positional information to a server 400 (S302), receiving, by the second white band device 600, unit region information and area information corresponding to the positional information from the server 400 (S303), determining, by the second white band device 600, whether an area represented by the received area information is a first area or a second area (S304), creating, by the second white band device 600, available channel information based on channel information of a sensed broadcasting signal when the received area information represents the first area (S305), transmitting, by the second white band device 600, the available channel information to a first white band device 500 in a unit region represented by the unit region information (S306), and receiving the available channel information from another second white band device when the received area information represents the second area (S307).

First, in step S301, the positional information creating module 610 of the second white band device 600 creates the positional information of the position to which the white band sensing device 600 belongs. As described above, the positional information may be created by using a method using a GPS satellite. The positional information may be configured to include, for example, a latitude and a longitude.

Subsequently, in step S302, the communication module 602 of the second white band device 600 transmits the positional information created in step S301 to the server 400.

In step S303, the communication module 602 of the second white band device 600 receives unit region information and area information on the position of the second white band device 600 as a response to the positional information from the server 400.

In step S304, it is determined, by using the area information, whether the second white band device 600 is in the first area where is perceptible the DTV signal or the second area where is imperceptible the DTV signal. When the area information represents the first area, the process proceeds to step S305 and when the area information represents the second area, the process proceeds to step S307.

In this case, whether to sense the DTV signal may be determined based on a predetermined threshold value as described above. Meanwhile, in another exemplary embodiment, the area may be divided into three or more areas according to the strength of the sensed signal.

In step S305, the signal sensing module 603 senses a DTV signal transmitted from a broadcasting station and an available channel information creating module 304 creates available channel information based on the (channel of) sensed DTV signal.

Since the first white band device 500 and the second white band device 600 may have the same configuration, the second white band device 600 may receive the available channel information from the first white band device 500 in this case. The available channel information creating module 604 of the second white band device 600 may combine the available channel information created by the available channel information creating module 604 and the available channel information received from the first white band device 500. That is, the available channel information with higher reliability may be created by the combination.

Subsequently, in step S306, the communication module 602 of the second white band device 600 transmits the created available channel information to the first white band device 500 which is in the same unit region as the second white band device 600 through the communication network (for example, the Internet network).

Meanwhile, when the area information received in step S304 represents the second area (step S307), available channel information is received from another second white band device that receives the area information representing the first area in the unit region.

In some exemplary embodiments, the method may further include providing, by the first or second white band device 500 or 600, a white band service by using available channel information created or received by the first or second white band device 500 or 600 of itself.

According to the available channel information sharing system 2000 and the available channel information sharing method according to the second exemplary embodiment of the present invention, even when the second white band sensing device 600 may not assure which area the second white band sensing device 600 is placed in, a more appropriate available channel information acquiring method may be performed according to the area represented by the area information received from the server 400.

Even when the first white band device 500 does not include the signal sensing module or when the second white band device 600 is placed in the second area, the available channel information may be received from the second white band sensing device 600 placed in the first area in the same unit region. Consequently, all white band devices may stably share the available channel information from the second white band device 600 which belongs to the first area in the same unit region through the communication network.

Meanwhile, when the plurality of second white band devices 300 are placed in the first area in the same unit region, since available channel information created by the respective second white band devices may be combined, the second white band devices may share available channel information with higher reliability with each other. The second white band devices may stably share the available channel information with high reliability with even other white band devices in the unit region through the communication network.

When the first or second white band device 500 or 600 includes a white band service module, the available channel information with high reliability shared by other white band devices may be used. As a result, the stable white band service may be provided while safely protecting the DTV signal from the interference influence.

Third Exemplary Embodiment

Figure 10A:
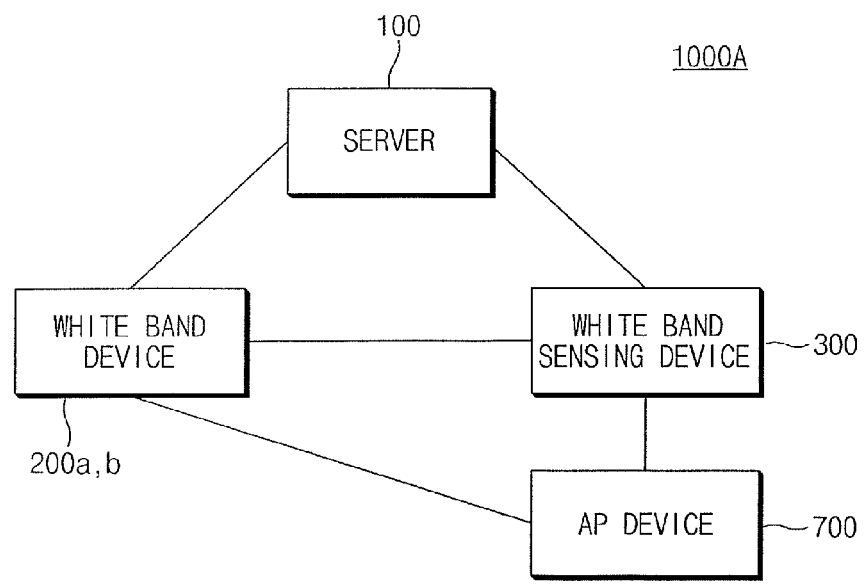
FIGS. 10A and 10B are diagrams illustrating that an access point device is adopted in the available channel information sharing system of the first or second exemplary embodiment.
Figure 10B:
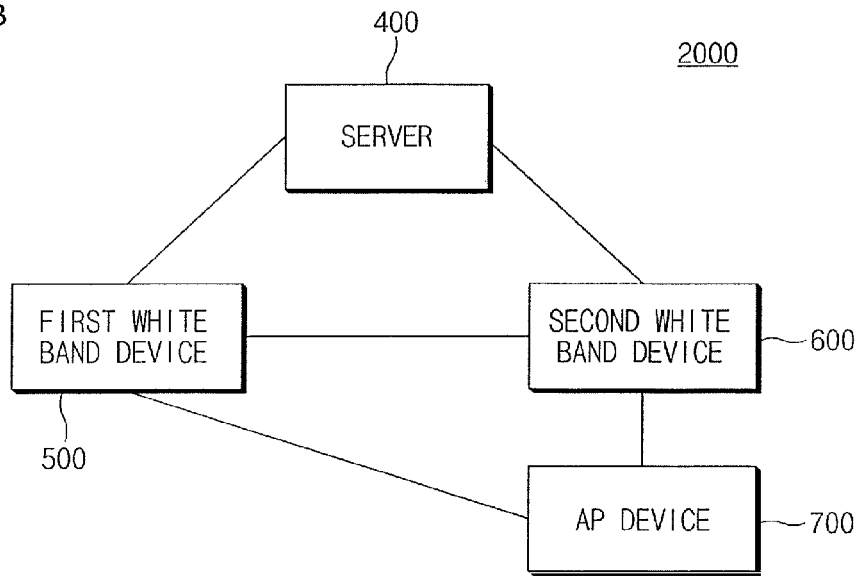

FIGS. 10A and 10B are diagrams illustrating that an access point device 700 is adopted in the available channel information sharing system of the first or second exemplary embodiment.

Referring to FIG. 10A, the access point device 700 is adopted in the available channel information sharing systems 1000A and 1000B of the first exemplary embodiment. The access point device 700 accesses the white band sensing device 300 to wirelessly transmit the first available channel information to the white band devices 200a and 200b with a higher transmission output than the white band sensing device 300.

Referring to FIG. 10B, the access point device 700 is adopted in the available channel information sharing system 2000 of the second exemplary embodiment. The access point device 700 accesses the second white band device 600. The access point device 700 may wirelessly transmit the available channel information to the white band device 500 with higher transmission output than the second white band device 600.

The access point device 700 is adopted in the available channel information sharing systems 1000A, 1000B, and 2000 to supplement an insufficient transmission output of the white band sensing device 300 or the second white band device at the time of transmitting the available channel information. As a result, the available channel information may be shared with the white band devices in the unit region with high reliability.

Fourth Exemplary Embodiment

In the aforementioned first or second exemplary embodiment, as the shape of the unit region, a quadrangular shape, a circular shape, and a hexagonal shape may be considered. The unit region may have a square shape of 100 m×100 m considered as a basic unit in the database accessing method among in the aforementioned available channel information acquiring method. When the square of 100 m×100 m is used as the unit region, combinations among unit regions may be achieved even though the database accessing method is used in another region. Meanwhile, the circular or hexagonal shapes assumed in a general communication network or cell may be considered.

Although the case has been described as an example, in which the primary user signal is the DTV broadcasting signal in the present invention, the present invention may be applied even to the case a channel should be preferentially allocated for various types of high-priority services as well as the DTV broadcasting. The method presented in the present invention is not limited to only the TV white space (TVWS) and the method may be applied to all bands to efficiently use a limited frequency resource in the frequency white band through signal sensing.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. Accordingly, the spirit of the present invention should be determined by the claims disclosed below and it should be appreciated that all modifications equal or equivalent thereto will be included in the scope of the present invention.

What is claimed is:

1. An available channel information sharing system sharing available channel information for each unit region, the system comprising:
a server;
a white band device placed in a unit region; and
a white band sensing device placed in the unit region, wherein the white band sensing device is configured to:
create position information,
transmit the created position information to the server,
receive unit region information corresponding to the position information from the server,
sense a first number of broadcasting signals broadcasted from at least one broadcasting station, and
transmit first available channel information based on channel information of the first number of broadcasting signals to the white band device.

2. The system of claim 1, wherein the white band device provides a white band service using the first available channel information.

3. The system of claim 1, wherein the white band device is configured to:
sense a second number of broadcasting signals broadcasted from the at least one broadcasting station,
create second available channel information based on channel information of the second number of broadcasting signals, and
transmit the second available channel information to the white band sensing device.

4. The system of claim 3, wherein the white band sensing device is further configured to transmit to the white band device third available channel information, wherein the third available channel information is a combination of the first available channel information and the second available channel information.

5. The system of claim 1, further comprising:
an access point device configured to relay and transmit the first available channel information from the white band sensing device to the white band device.

6. The system of claim 1, wherein the white band sensing device is placed in an area where is perceptible the broadcasting signal as a value equal to or more than a predetermined sensing threshold value.

7. The system of claim 1, wherein the unit region has any one shape of a square shape, a circular shape, and a hexagonal shape.

8. The system of claim 1, wherein the server is configured to determine the unit region information based on the position information received from the white band sensing device.

9. An available channel information sharing system sharing available channel information for each unit region, the system comprising:
a server;
a first white band device placed in a unit region; and
a second white band device placed in the unit region, wherein the second white band device is configured to:
create position information,
transmit the created position information to the server,
receive unit region information and area information corresponding to the position information from the server,
sense at least one broadcasting signal broadcasted from at least one broadcasting station, and
transmit available channel information based on channel information of the sensed broadcasting signal to the first white band device when the area information represents an area where is perceptible the broadcasting signal.

10. The system of claim 9, wherein the second white band device is configured to receive the available channel information from another second white band device when the area information represents an area where is imperceptible the broadcasting signal, and
wherein the another second white band device is placed in the unit region, and receives an area information representing an area where is perceptible the broadcasting signal.

11. The system of claim 10, wherein at least one of the first white band device, the second white band device, and the another second white band device provides a white band service by using the available channel information.

12. The system of claim 10, wherein the area where is imperceptible the broadcasting signal is an area where is perceptible the broadcasting signal as a value less than the predetermined sensing threshold value.

13. The system of claim 9, wherein the area where is perceptible the broadcasting signal is an area where is perceptible the broadcasting signal as a value equal to or more than a predetermined sensing threshold value.

14. The system of claim 9, further comprising:
an access point device configured to relay and transmit the available channel information to the first white band device from the second white band device.

15. The system of claim 9, wherein the server is configured to determine the unit region information and the area information based on the position information received from the white band sensing device.

16. An available channel information sharing method, the method comprising:
creating, by a white band sensing device, position information;
transmitting, by the white band sensing device, the position information to a server;
receiving, by the white band sensing device, unit region information corresponding to the position information from the server;
sensing, by the white band sensing device, a first number of broadcasting signals broadcasted from at least one broadcasting station;
creating, by the white band sensing device, first available channel information based on channel information of the first number of broadcasting signals; and
transmitting, by the white band sensing device, the first available channel information to a white band device placed in the unit region represented by the unit region information.

17. The method of claim 16, further comprising:
providing, by the white band device, a white band service by using the first available channel information.

18. The method of claim 16, further comprising:
sensing, by the white band device, a second number of broadcasting signals broadcasted from the at least one broadcasting station;
creating, by the white band device, second available channel information based on channel information of the second number of broadcasting signals; and transmitting, by the white band device, the second available channel information to the white band sensing device.

19. The method of claim 18, further comprising:

creating, by the white band sensing device, third available channel information, wherein the third available channel information is a combination of the first available channel information and the second available channel information; and transmitting, by the white band sensing device, the third available channel information to the white band device.

* * * * *